(12) United States Patent
Ohsawa et al.

(10) Patent No.: US 8,419,412 B2
(45) Date of Patent: Apr. 16, 2013

(54) NANO-IMPRINT MOLD AND SUBSTRATE WITH UNEVEN PATTERNS MANUFACTURED BY USING THE MOLD

(75) Inventors: Yuichi Ohsawa, Yokohama (JP); Junichi Ito, Yokohama (JP); Tomotaka Ariga, Kawasaki (JP); Yoshinari Kurosaki, Kawasaki (JP); Saori Kashiwada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 9 days.

(21) Appl. No.: 13/422,897

(22) Filed: Mar. 16, 2012

(65) Prior Publication Data
US 2012/0196084 A1  Aug. 2, 2012

Related U.S. Application Data

(63) Continuation of application No. PCT/JP2009/004747, filed on Sep. 18, 2009.

(51) Int. Cl.
*B29C 59/00* (2006.01)

(52) U.S. Cl.
USPC .............................. 425/385; 425/394; 264/293

(58) Field of Classification Search .................. 425/385, 425/394; 264/293
See application file for complete search history.

(56) References Cited

U.S. PATENT DOCUMENTS

| | | | |
|---|---|---|---|
| 2003/0099737 A1* | 5/2003 | Eldridge et al. | ............. 425/385 |
| 2007/0222098 A1 | 9/2007 | Sato et al. | |
| 2008/0142680 A1* | 6/2008 | Usa et al. | ..................... 249/160 |
| 2008/0286449 A1 | 11/2008 | Park | |

FOREIGN PATENT DOCUMENTS

| | | |
|---|---|---|
| JP | 2000-231011 A | 8/2000 |
| JP | 2003-236846 A | 8/2003 |
| JP | 2006-069159 A | 3/2006 |
| JP | 2006-164393 A | 6/2006 |
| JP | 2007-253577 A | 10/2007 |
| JP | 2008-162040 A | 7/2008 |
| JP | 2009-226762 A | 10/2009 |
| WO | WO 2006/027979 A1 | 3/2006 |

OTHER PUBLICATIONS

International Search Report issued Feb. 16, 2010 in PCT/JP2009/004747 filed Sep. 18, 2009 (with English Translation).
Written Opinion Report issued Feb. 16, 2010 in PCT/JP2009/004747 filed Sep. 18, 2009.

* cited by examiner

*Primary Examiner* — James Sanders
(74) *Attorney, Agent, or Firm* — Oblon, Spivak, McClelland, Maier & Neustadt, L.L.P.

(57) ABSTRACT

According to one embodiment, a nano-imprint mold includes plural pairs of first and second protrusions formed on a base layer, each of which is formed along the same straight line. Each protrusion has a top surface and four side surfaces. The first and second protrusions are mirror-symmetrical with each other. A first side surface of the first protrusion and a second side surface of the second protrusion face each other. A first angle between the first side surface or the second side surface and a main surface of the base layer is not less than 85° and not more than 90°. A second angle between a third side surface in the first protrusion or a fourth side surface in the second protrusion and the main surface of the base layer is not less than 70° and not more than 88°. The first angle is larger than the second angle.

6 Claims, 12 Drawing Sheets

*Fig.8A(a)*
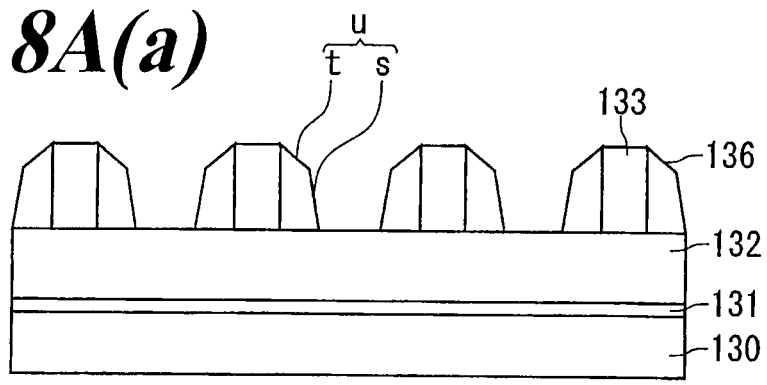
*Fig.8A(b)*
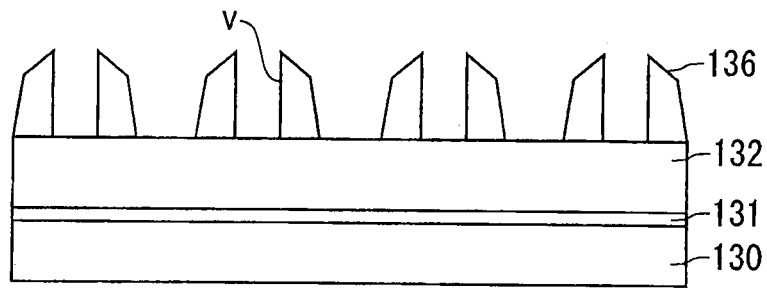
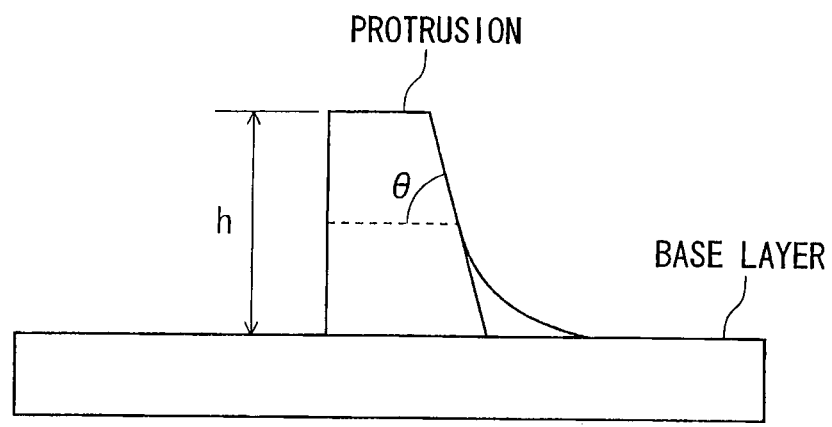
*Fig.8B*

NANO-IMPRINT MOLD AND SUBSTRATE WITH UNEVEN PATTERNS MANUFACTURED BY USING THE MOLD

This is a Continuation Application of PCT Application No. PCT/JP2009/004747, filed on Sep. 18, 2009, which was published under PCT Article 21(2) in Japanese, the entire contents of which are incorporated herein by reference.

FIELD

Embodiments described herein relate generally to a mold and a substrate with uneven patterns manufactured by using the mold.

BACKGROUND

There is a technology called NIL (Nano-Imprint Lithography) where, to apply a fine uneven pattern to a substrate surface, a polymer containing a photo-curable resin, or the like is applied to the substrate surface and a pressing board having asperities called a mold is pressed against the substrate surface to thereby transfer the fine uneven pattern to the substrate surface.

BRIEF DESCRIPTION OF THE SEVERAL VIEWS OF THE DRAWINGS

A general configuration that implements the various features of the invention will be described with reference to the drawings. The drawings and the associated descriptions are provided to illustrate embodiments of the invention and not to limit the scope of the invention.

FIGS. 8A(a), 8A(b) and 8B are exemplary views for explaining a method of manufacturing the mold of the first modification embodiment;

FIG. 8B is an exemplary view for explaining an angle;

DETAILED DESCRIPTION

Figure 1A:
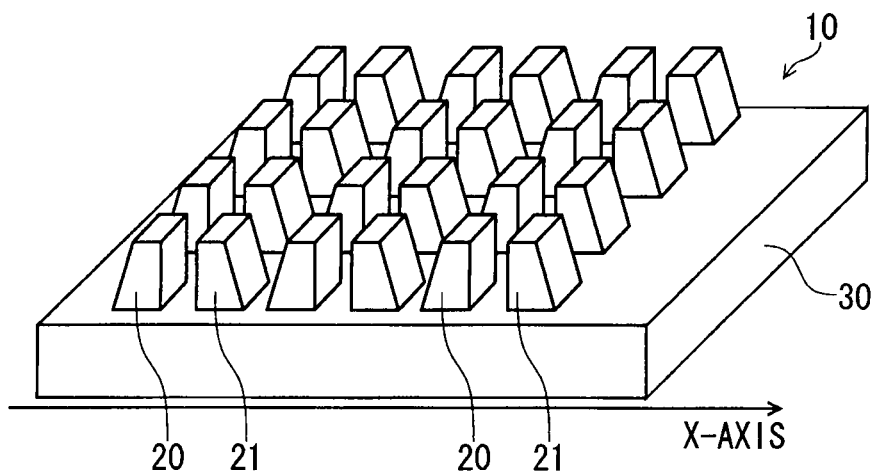
FIGS. 1A and 1B are exemplary schematic views showing a mold according to a first embodiment.

In general, according to one embodiment, a nano-imprint mold includes a plurality of pairs of first and second protrusions formed on a base layer. Each of the pairs is formed along a same straight line. Each of the first and second protrusions comprises a top surface and four side surfaces. The first and second protrusions are mirror-symmetrical with each other. A first side surface of the first protrusion and a second side surface of the second protrusion face each other. A first angle between the first side surface or the second side surface and a main surface of the base layer is not less than 85° and not more than 90°. A second angle between a third side surface opposed to the first side surface in the first protrusion or a fourth side surface opposed to the second side surface in the second protrusion and the main surface of the base layer is not less than 70° and not more than 88°. The first angle is larger than the second angle.

Hereinafter, exemplary embodiments will be described with reference to the drawings. Moreover, in the drawings described below, elements the reference designations of which are the same are the same elements, and overlapping descriptions are omitted. Moreover, the present embodiments are made bearing in mind an imprint technology of forming a nanometer scale pattern on a polymer applied onto a substrate.

First Embodiment

A mold 10 according to a first embodiment will be described.

Figure 1B:
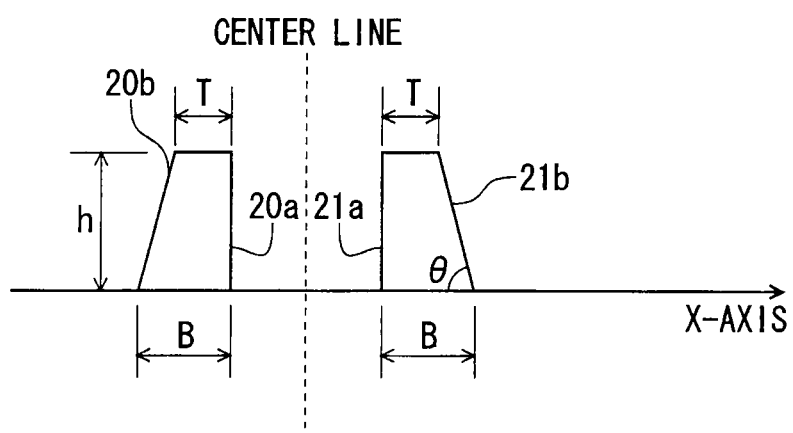

FIGS. 1A and 1B are schematic views showing the mold 10 according to the present embodiment.

On the mold according to the present embodiment, as shown in FIG. 1A, a pair of two protrusions 20 and 21 is formed more than one in number on a base layer 30. These protrusions 20 and 21 each have a top surface and four side surfaces. Moreover, the protrusions 20 and 21 have steep side surfaces 20a and 21a, and further, have gently-sloping side surfaces 20b and 21b so as to be opposed to the side surfaces 20a and 21a.

The side surfaces 20a and 20b constituting the protrusion 20 and the side surfaces 21a and 21b constituting the protrusion 21 are mirror-symmetrical to each other, the steep side surface 20a and the steep side surface 21a are opposed to each other, and the gently-sloping side surface 20b and the gently-sloping side surface 21b are opposed to each other. That is, the side surface 20a and the side surface 21a, and the side surface 20b and the side surface 21b are in a mirror relationship, and are in a relationship where when the protrusion 20 is flipped with respect to the center line intermediate between the protrusion 20 and the protrusion 21, it coincides with the shape of the protrusion 21.

Further, when viewed from one direction, as shown in FIG. 1B, one steep side surfaces 20a and 21a constituting the protrusions 20 and 21 are opposed to each other within a plane. Here, the direction in which the side surfaces 20a and 21a of the protrusions 20 and 21 are opposed to each other within the plane is an X-axis direction.

Moreover, the width T of the top surfaces of the protrusions 20 and 21 in the X-axis direction is 5 nm, the width B of the bottom surfaces is 5.9 nm, and the height h is 10 nm. These protrusions 20 and 21 are formed on the base layer 30 so as to be separated 3.2 nm in the X-axis direction.

While the angle between the side surfaces 20a and 21a and the main surface of the base layer 30 is 90°, effects of the present embodiment are also obtained when it is not less than 85° and not more than 90°. Moreover, the angle θ between the side surfaces 20b and 21b opposed to the side surfaces 20a and 21a within the protrusions 20 and 21 and the main surface of the base layer 30 is not less than 70° and not more than 88°. At this time, it is preferable that the angle between the side surfaces 20a and 21a and the main surface of the base layer 30 be larger than the angle between the side surfaces 20b and 21b and the main surface of the base layer 30.

For the base layer 30, quartz glass may be used. For the protrusions 20 and 21, silicon, silicon oxide, aluminum oxide or the like may be used.

Figure 2A:
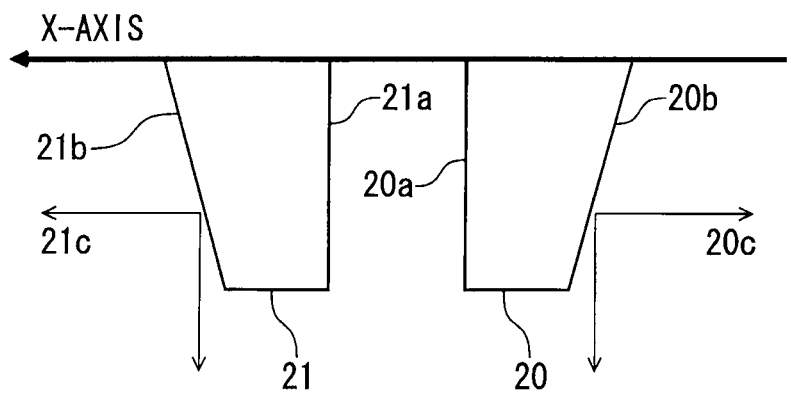
FIG. 2A is an exemplary view for explaining the first embodiment.

By forming such symmetrical protrusions 20 and 21 more than one in number on the base layer 30, variation in pattern size can be reduced for the polymer-applied substrate. This is because as shown in FIG. 2A, the polymer tends to be readily pushed out in a direction where the inclination is gentle and forces 20c and 21c in the X-axis direction caused when the polymer is pushed out are offset by each other.

Figure 2B:
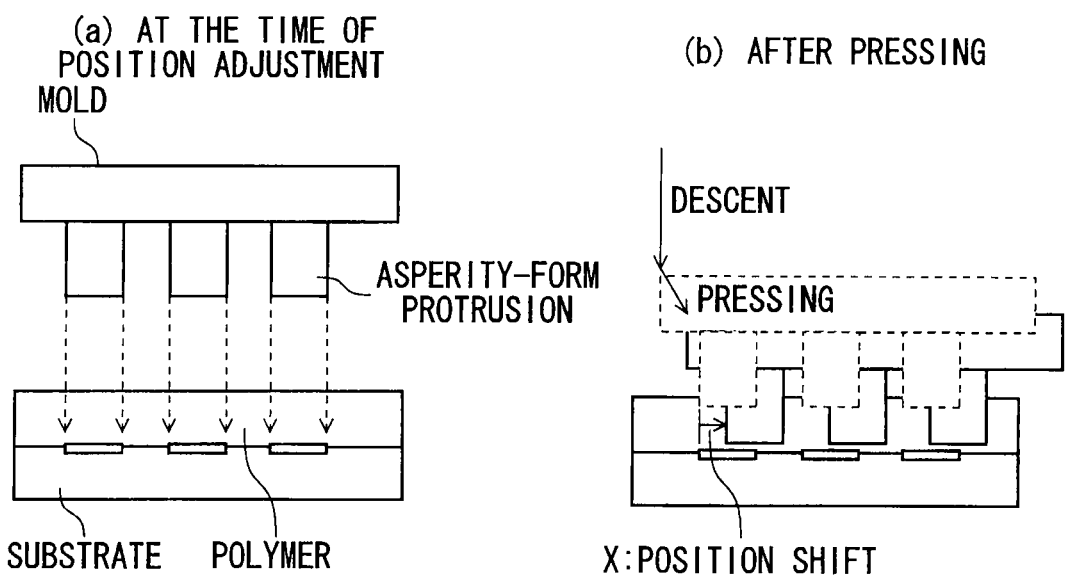
FIG. 2B is an exemplary view for explaining a position shift caused when the mold is pressed against a polymer applied to a substrate.

FIG. 2B is a view for explaining a position shift. FIG. 2B(a) is a view showing a position adjustment when a mold is pressed against a polymer applied to a substrate. FIG. 2B(b) is a view of the mold being pressed against the polymer applied to the substrate.

As shown in FIG. 2B(a), position adjustment is made first, and as shown in FIG. 2B(b), the mold is pressed against the polymer applied to the substrate. Although no position shift is caused until the descent of the mold, since the polymer is pushed with several tons, it is known that a position shift of not less than approximately 10 nm is caused after the mold is pressed against the polymer.

With the mold 10 according to the present embodiment, since the direction in which the polymer is pushed away can be fixed by forming the pair of two symmetrical protrusions on the mold 10 more than one in number, the position shill can be suppressed.

Moreover, by using the mold 10 according to the present embodiment, when the mold is pushed into the polymer applied onto the substrate and the mold is lifted, variation in the pattern width formed on the polymer can be suppressed. The variation in pattern width is caused because the pressure at which the polymer applied to the substrate is pressed differs according to the place where it is pressed. This is because generally, when a mold is pressed against a polymer applied onto a substrate, it is difficult to apply a uniform pressure to within the surface of the substrate.

Hereinafter, the variation in pattern width will be described.

Figure 2C:
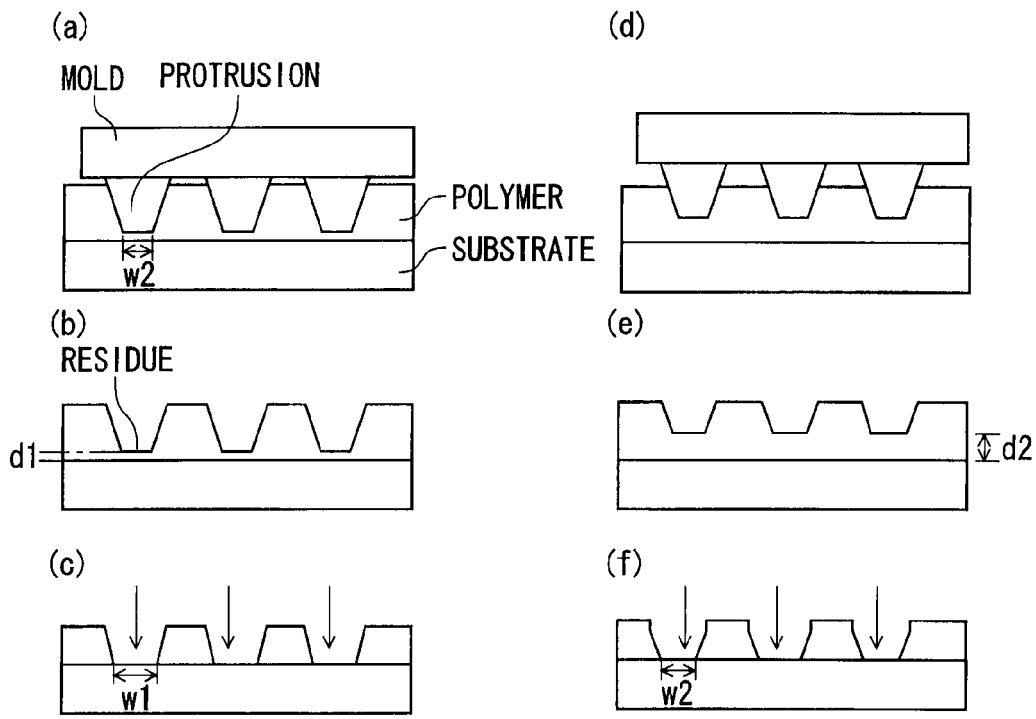
FIG. 2C is an exemplary view for explaining variation in pattern width caused when the mold is pressed against the polymer applied to the substrate.

FIG. 2C is a view for explaining a reason why the variation in pattern width is caused when a mold having a plurality of chevron protrusions is pressed against a polymer applied to a substrate.

FIGS. 2C(a), (b) and (c) show a polymer cross section in a case where the applied pressure is high when the polymer applied onto the substrate is pushed by the mold. FIGS. 2C(d), (e) and (f) show a polymer cross section in a case where the applied pressure is low when the polymer applied onto the substrate is pushed by the mold.

First, as shown in FIGS. 2C(a) and (d), in the condition shown in FIG. 2C(a), the pressure applied to the polymer is high, and in the condition shown in FIG. 2C(d), the pressure applied to the polymer is low. Therefore, due to the difference in the magnitude of the applied pressure, variation is caused in the width of the pattern formed on the polymer.

Then, as shown in FIGS. 2C(b) and (e), UV irradiation is performed to cure the polymer, and the mold is separated. Thereafter, when the pressure applied to the polymer applied onto the substrate is high (FIG. 2C(b)), a residue $d_1$ is caused.

On the other hand, when the pressure applied to the polymer applied onto the substrate is low (FIG. 2C(e)), a residue $d_2$ is caused.

Regarding these residues $d_1$ and $d_2$, the thickness of the residue $d_2$ is larger. This is because the pressure applied to the polymer applied to the substrate is lower in the place where the residue $d_2$ is caused.

Thereafter, as shown in FIGS. 2C(c) and (f), the residues $d_1$ and $d_2$ are removed by oxygen plasma so that the substrate surface is partly exposed, and the pattern of the polymer is formed. In this case, since it is necessary to remove all the residues, the polymer is etched according to the thickness of the residue $d_2$ the thickness of which is larger. Here, the width of the part where the substrate surface from which the residue has been removed is exposed (pattern width) will be referred to as $w_1$ for the place where the pressure applied to the polymer applied onto the substrate is high and as $w_2$ for the place where the pressure applied to the polymer applied onto the substrate is low.

At this time, since setting is made so that the part, where the thickness of the residue is larger, of the polymer applied to the substrate is removed, the polymer is removed more in the place where the pressure applied to the polymer applied onto the substrate is higher. For this reason, the pattern width $w_1$ is larger than the pattern width $w_2$.

On the other hand, when the angle between the one side surfaces 20a and 21a and the main surface of the base layer 30 is set to 90° and the angle between the other side surfaces 20b and 21b and the main surface of the base layer 30 is set to not less than 70° and not more than 88° as in the present embodiment, the difference in pattern width, that is, the variation in pattern width is reduced.

Figure 2D:
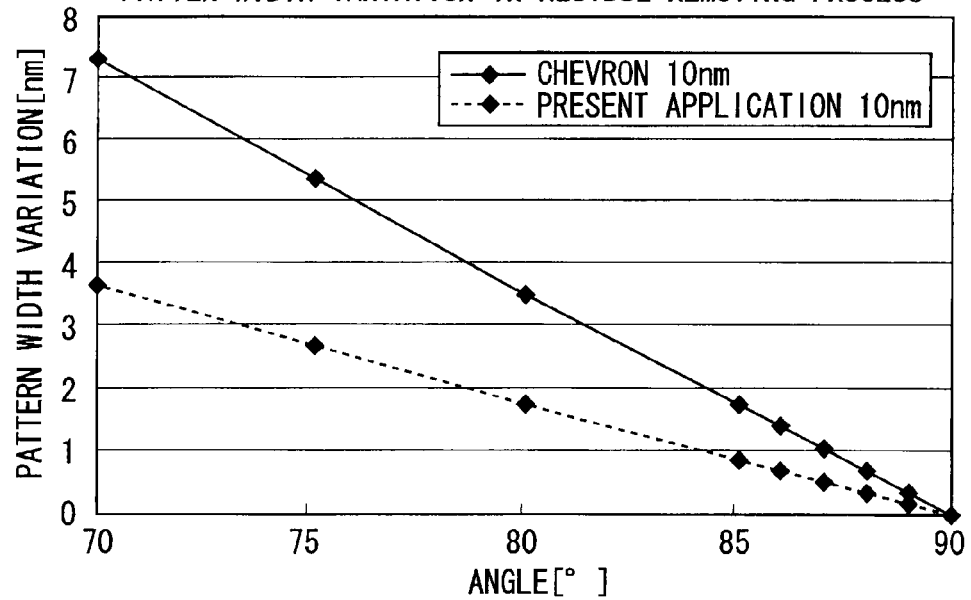
FIG. 2D is an exemplary view for explaining variation in pattern width caused when the mold is pressed against the polymer applied to the substrate.

FIG. 2D is a view showing how much the pattern width variation ($w_1$-$w_2$) is changed between when a pattern is formed on a substrate surface by using the mold 10 of the present embodiment and when a pattern is formed on a substrate surface by using a mold having chevron asperities. The solid line shown in FIG. 2D shows a case where a mold is used where the width of the end portions of the protrusions constituting the chevron asperities is 10 nm, and the broken line shows a case where the width of the top surfaces of the protrusions of the present embodiment is 10 nm. The angle between the side surfaces 20a and 21a of the mold 10 according to the present embodiment and the main surface of the base layer 30 was fixed to 90°, and the angle between the side surfaces 20b and 21b and the main surface of the base layer 30 was changed between 70° and 90°. On the other hand, in the case of the chevron shape, the angle between the main surface of the substrate constituting the mold and the asperities was changed between 70° and 90°.

From FIG. 2D, for example, it is found that the pattern width variation at an angle of 80° is 3.5 nm in the case of the chevron shape and is as small as 1.8 nm in the present embodiment.

Figure 2E:
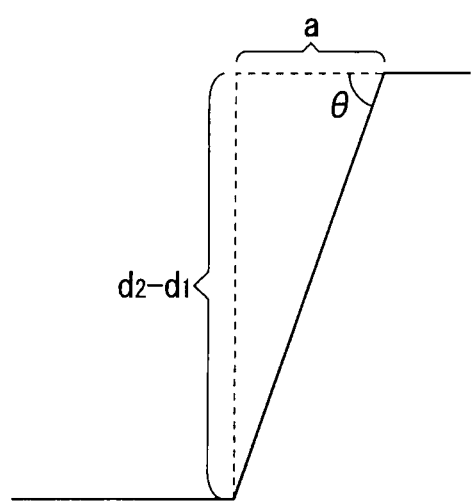
FIG. 2E is an exemplary view for explaining wideness in pattern width.

It can be explained by using FIG. 2E that the pattern width variation differs by nearly twice between the mold of the present embodiment and the chevron mold as described above.

FIG. 2E is a view explaining the relationship between the difference between the polymer residue $d_2$ and the polymer residue $d_1$ and the pattern width shown in FIGS. 2C(b) and (e).

As shown in FIG. 2E, when the residue is removed by oxygen plasma, the pattern width is widened by a width a shown by the following expression 1:

[Expression 1]

$$a = \frac{d_2 - d_1}{\tan\theta}$$ (Expression 1)

Therefore, in the case of the chevron mold, since the number of slanting surfaces of the protrusions constituting the mold is two, the width a is twice that of the mold of the present embodiment. Therefore, with the chevron mold, the pattern width variation is nearly twice that of the present embodiment.

Next, a method of manufacturing the mold 10 of the present embodiment will be described by using FIGS. 3A to 3E.

Figure 3A:
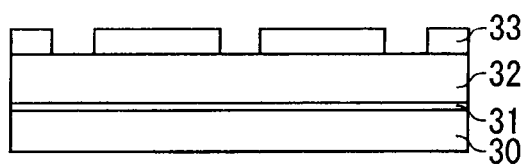
FIGS. 3A to 3E are exemplary views for explaining a method of manufacturing the mold of the first embodiment.

As shown in FIG. 3A, an amorphous Si (hereinafter, referred to as a-Si) 31 layer is formed 20 nm on the base layer 30 with a thickness of 0.7 mm by the CVD (Chemical Vapour Deposition) method. A silicon oxide layer 32 with a thickness of 5 nm is formed on the a-Si layer 31 by using the CVD method. Further, an electron beam lithography resist (hereinafter, referred to as resist) layer 33 is applied onto the silicon oxide layer 32 by spin coating. Further, electron beam lithography is applied to the resist layer 33 and development is performed, thereby forming spaces with a width of approximately 10 nm and lines of 30 nm.

Figure 3E:
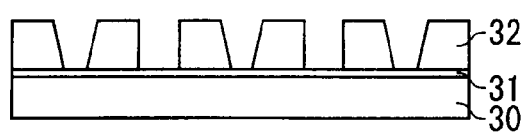
Figure 3B:
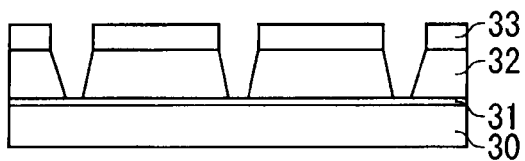

Then, as shown in FIG. 3B, RIE (Reactive Ion Etching) is performed at 20° C. by using $CHF_3$ gas, and the silicon oxide layer 32 is removed by an oxygen asher. At this time, on the side walls of the silicon oxide layer 32, an inclination of approximately 85° with respect to the main surface of the base layer 30 is formed with the protection by the re-adherence of the silicon oxide.

Figure 3C:
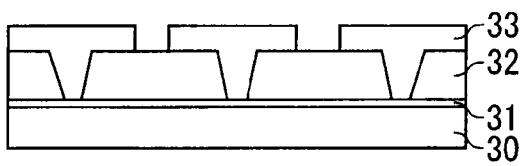

Then, as shown in FIG. 3C, the resist is applied again, and spaces of approximately 10 nm are formed in the parts where silicon oxide layer 32 is formed.

Figure 3D:
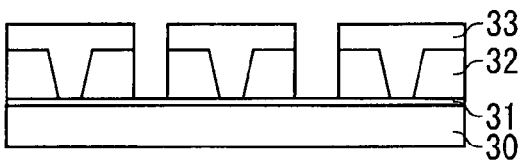

Then, as shown in FIG. 3D, RIE is performed at 120° C. by using $CHF_3$ gas, and the silicon oxide layer 32 is etched with the a-Si layer 31 as the etching stopper layer. At this time, since the silicon oxide does not readily re-adhere to the side wall of the silicon oxide layer 32, a groove the angle from the main surface of the base layer 30 of which is close to 90° is processed.

Lastly, as shown in FIG. 3E, by removing the resist layer 33 by an oxygen asher, an uneven pattern with a 10-nm line and space is formed on the base layer 30, and the mold 10 according to the present embodiment can be manufactured.

By using the mold 10 of the present embodiment, the variation in pattern size can be reduced for the substrate to which a polymer is applied. Further, the position shift caused when the mold 10 is pressed against the polymer applied to the substrate can be suppressed.

In addition, the variation in the width of the pattern formed on the polymer applied to the substrate after the mold is pushed in and the mold is lifted can be suppressed.

Second Embodiment

Figure 4A:
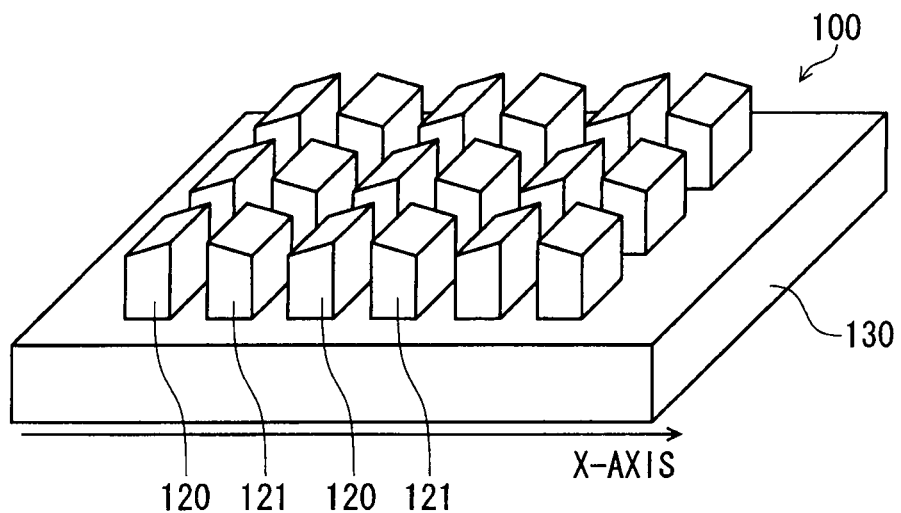
FIGS. 4A and 4B are exemplary views showing a mold according to a second embodiment.
Figure 4B:
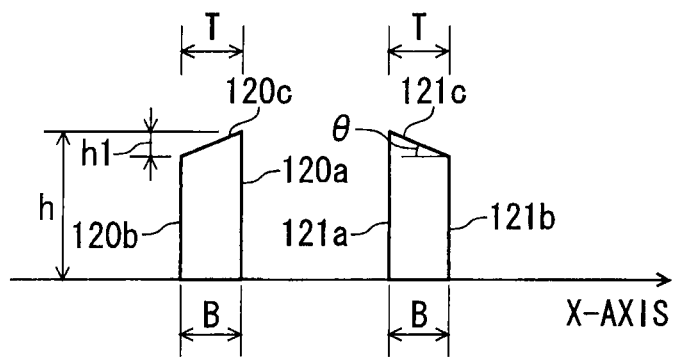

FIGS. 4A and 4B are views explaining a mold 100 according to the present embodiment.

The mold 100 according to the present embodiment is, as shown in FIG. 4A, different from the mold 10 in that the angle between side surfaces 120b and 121b constituting protrusions 120 and 121 and the main surface of a base layer 130 is not less than 85° and not more than 90° and that top surfaces 120c and 121c of the protrusions 120 and 121 are inclined with respect to the main surface of the base layer 130.

The width T, in the X-axis direction, of the top surfaces of the protrusions 120 and 121 constituting the mold 100 is 5 nm. The height h of the side surfaces 120a and 121a from the main surface of the base layer 130 is 10 nm. The height of the side surfaces 120a and 121a where the protrusions 120 and 121 are opposed to each other within a plane, from the main surface of the base layer 130 is larger than the height of the side surfaces 120b and 121b opposed to the side surfaces 120a and 121a, respectively, from the main surface of the base layer 130. The difference h therebetween is 0.4 nm. Moreover, the angle θ between the main surface of the base layer 130 and the top surfaces 120c and 121c of the protrusions 120 and 121 is not less than 2° and not more than 20°.

Figure 5A:
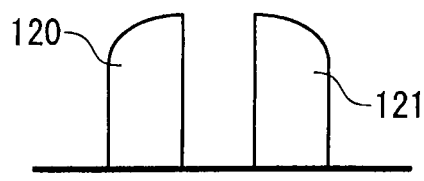
FIGS. 5A to 5C are exemplary views for explaining the second embodiment.
Figure 5B:
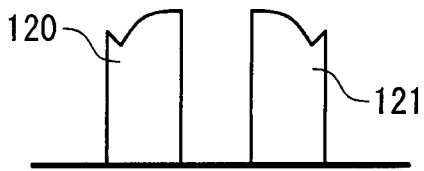
Figure 5C:
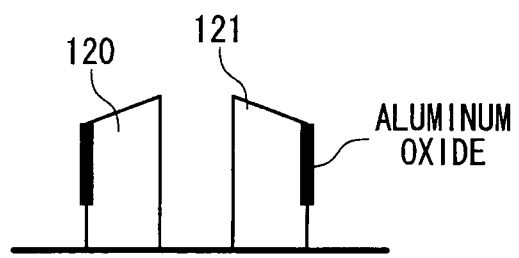

The top surfaces 120c and 121c of the protrusions 120 and 121 may be arc-shaped as shown in FIG. 5A or may have an asperity on the side of the side surfaces 120b and 121b as shown in FIG. 5B. Moreover, as shown in FIG. 5C, aluminum oxide may be formed in upper parts of the side surfaces 120b and 121b. By thus forming aluminum oxide in the upper parts, the strength of the upper parts of the protrusions 120 and 121 can be increased, and the variation in pattern size can be reduced.

Next, a method of manufacturing the mold 100 of the present embodiment will be described by using FIGS. 6A to 6F.

Figure 6A:
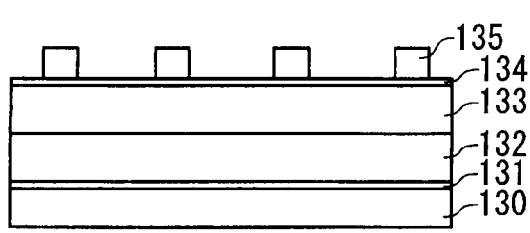
FIGS. 6A to 6F are exemplary views for explaining a method of manufacturing the mold of the second embodiment.

As shown in FIG. 6A, an aluminum oxide layer 131 is formed 5 nm and an a-Si layer 132 is formed 20 nm on the base layer 130 with a thickness of 0.7 mm by the CVD (Chemical Vapour Deposition) method. Further, by using the sputtering method, a carbon layer 133 is formed 15 nm and an aluminum oxide layer 134 is formed 3 nm on the a-Si layer 132. Lastly, a resist layer 135 serving as the mask pattern is formed.

Figure 6D:
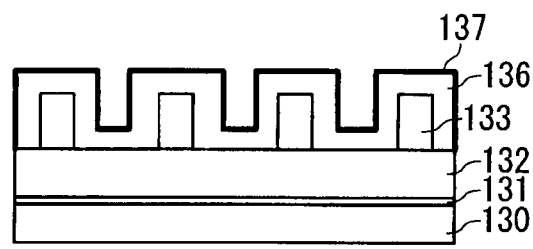
Figure 6B:
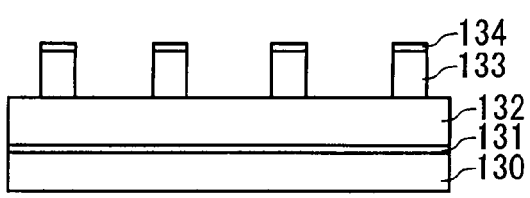

Then, as shown in FIG. 6B, with the resist layer 135 as the mask, the aluminum oxide layer 134 is etched by the RIE (Reacted Ion Etching) method by $CHF_3$ gas, and the carbon layer 133 is etched by the RIE method by an oxygen gas. At this time, the resist layer 135 is removed.

Figure 6E:
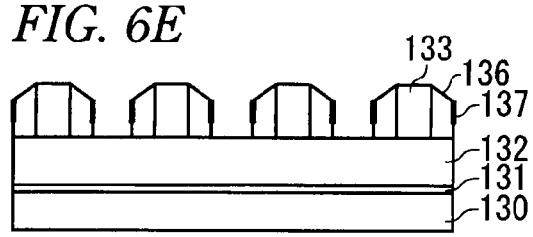
Figure 6C:
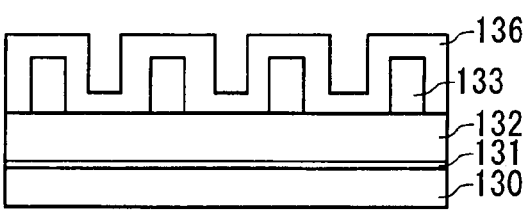

Then, as shown in FIG. 6C, after the aluminum oxide layer 134 remaining on the carbon layer 133 is immersed in TMAH (tetramethylammonium hydroxide) and removed, a silicon oxide layer 136 is formed 5 nm on the remaining carbon layer 133 by using the ALD (Atomic Layer Deposition) method.

Then, as shown in FIG. 6D, an aluminum oxide layer 137 is formed on the silicon oxide layer 136.

Then, as shown in FIG. 6E, by performing RIE by using $CHF_3$ gas, the aluminum oxide layer 137 and the silicon oxide layer 136 are etched. At this time, since the etching rate for the aluminum oxide is lower than that for the silicon oxide, inclination does not readily occur in the side wall direction. For this reason, a vertical wall is readily formed.

Figure 6F:
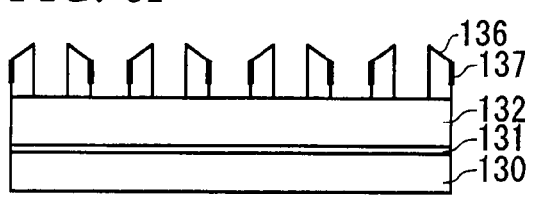

Lastly, as shown in FIG. 6F, the carbon layer 133 is removed by performing RIE by oxygen, and the mold 100 can be manufactured.

First Modification

Figure 7A:
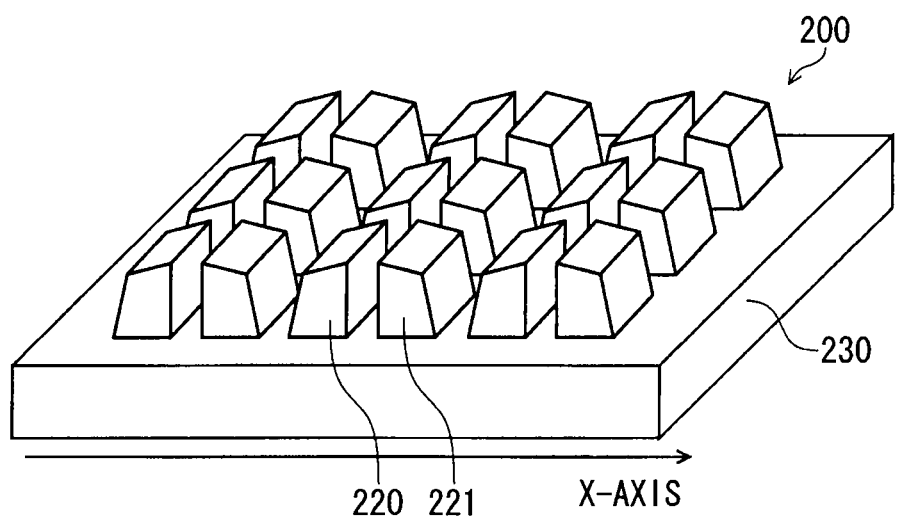
FIGS. 7A and 7B are exemplary views for explaining a first modification.
Figure 7B:
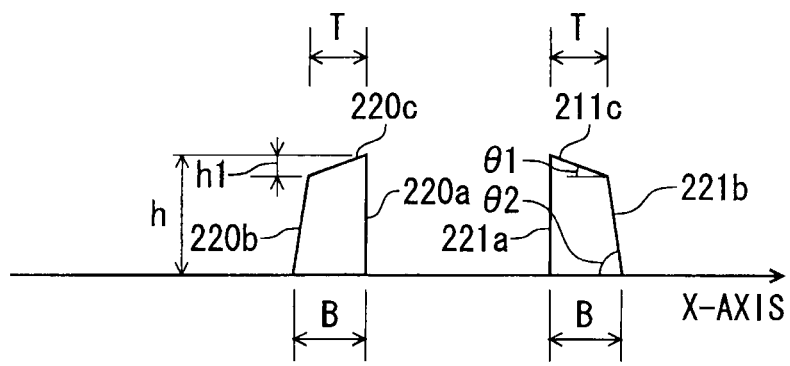

FIGS. 7A and 7B are views explaining a mold 200 according to the present modification. In the mold 200 according to the present modification, as shown in FIG. 7A, protrusions 220 and 221 are combinations of the protrusions 20 and 21 and the protrusions 120 and 121.

That is, as shown in FIG. 7B, top surfaces 220c and 221c of the protrusions 220 and 221 are inclined with respect to the main surface of a base layer 230. The angle between side surfaces 220a and 221a and the main surface of the base layer 230 is 90°. The angle between side surfaces 220b and 221b and the main surface of the base layer 230 is not less than 70° and not more than 88°.

The width of the top surfaces of the protrusions 220 and 221 is 5 nm. The height of the side surfaces 220a and 221a from the main surface of the base layer 230 is 10 nm. The height of the side surfaces 220a and 221a where the protrusions 220 and 221 are opposed to each other within a plane, from the main surface of the base layer 230 is larger than the height of the side surfaces 220b and 221b opposed to the side surfaces 220a and 221a, respectively, from the main surface of the base layer 230, and the difference h1 therebetween is 0.4 nm. Moreover, the angle $\theta_1$ between the main surface of the base layer 230 and the top surfaces 220c and 221c of the protrusions 220 and 221 is not less than 3° and not more than 20°. The angle between the side surfaces 220b and 221b and the main surface of the base layer 230 is not less than 70° and not more than 88°.

Next, a method of manufacturing the mold 200 of the present modification will be described.

As the first process, the process from FIG. 6A to FIG. 6C is performed. Description of the process from FIG. 6A to FIG. 6C is omitted.

Then, as shown in FIG. 8A(a), the silicon oxide layer 136 is anisotropically etched by RIE using $CHF_3$ gas. At this time, the silicon oxide layer 136 in the upper part and the lower part of the carbon layer 133 is selectively etched, in the upper part of the side wall of the silicon oxide layer 136, an inclination is formed with respect to the main surface of the base layer 130 (t in the figure), and further, in the lower part of the side wall of the silicon oxide layer 136, an inclination is also formed with respect to the main surface of the base layer 130 (s in the figure). This side wall of the silicon oxide layer 136 formed by RIE is represented as u. By this process, the carbon layer 133 is exposed.

Then, as shown in FIG. 8A(b), the carbon layer 133 is removed by RIE using an oxygen gas. Thereby, the angle between the side wall (v in the figure) of the silicon oxide layer 136 formed on the carbon layer 133 and the main surface of the base layer 130 becomes close to 90°.

With the mold 200 according to the present modification, a pattern size with little variation can also be formed on a photochemical resin applied to a substrate surface.

The above-described embodiments and modification also apply to a case where a reversed mold is obtained by forming a conductive film on a mold and plating the mold with Ni or the like and reversing it, and then the polymer surface is pushed by using the reversed mold. Moreover, the above-described embodiments and modification are not limited thereto, and a mold can be obtained where using a mold plated with Ni or the like and reversed, the mold is further plated with Ni or the like and reversed.

Moreover, when the angles are defined in the above-described embodiments and modification, in a case where the two surfaces forming the angles have a tailing shape, the position at 50% of the height h of the protrusions constituting the mold can be substantially defined as the side surface angle, as shown in FIG. 8B.

Moreover, the angle difference between the top surfaces of the protrusions and the main surface of the base layer can also be defined as the angle difference between the angle at 50% of the height of the top surface and the main surface of the base layer.

Example 1

Using the mold 10, it was examined how much of a position shift was caused when the mold 10 was pushed into the polymer applied onto the substrate if the angle θ between the side surfaces 20b and 21b and the main surface of the base layer 30 was reduced from 90°. The side surfaces 20a and 21a opposed to the side surfaces 20b and 21b are approximately 90°.

Figure 9:
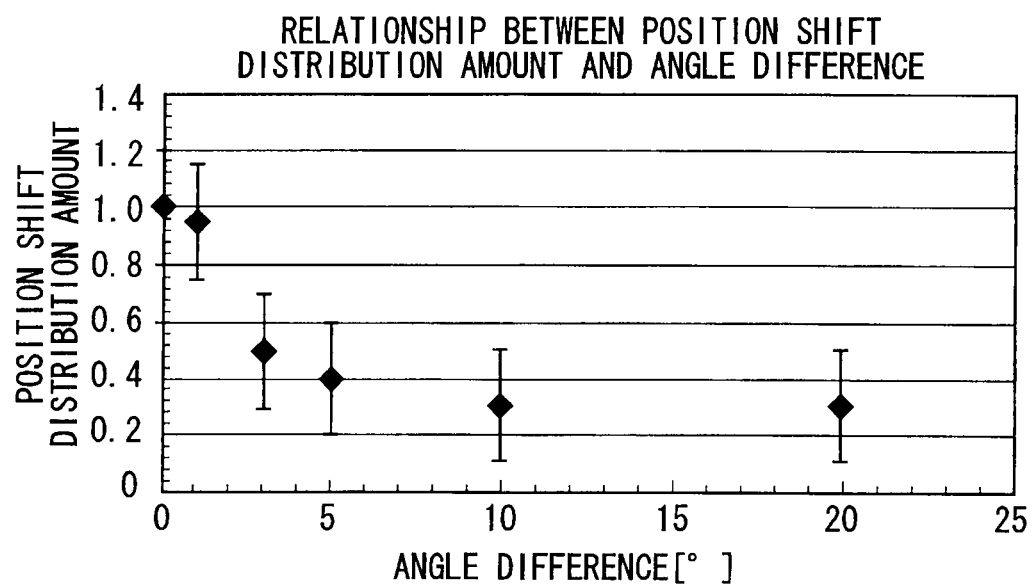
FIG. 9 is an exemplary view showing a measurement result of position shift amount of the mold according to the first embodiment.

FIG. 9 is a view where the mold 10 was pressed for ten seconds with a pressure of 1 MPa against a polymer containing a photo-curable resin applied onto a glass substrate, UV irradiation was performed thereon, multipoint measurement of the position shift distribution amount was performed with an SEM (Scanning Electron Microscope) and the result is graphed. The vertical axis of FIG. 9 represents the position shift amount, and the horizontal axis represents the angle difference between the angle between the side surfaces 20b and 21b of the protrusions 20 and 21 and the main surface of the base layer 30 and the angle between the side surfaces 20a and 21a constituting the protrusions 20 and 21 and the main surface of the base layer 30. The angle between the side surfaces 20a and 21a and the main surface of the base layer 30 is set to approximately 90°.

The position shift distribution amount is generally defined as 3σ, and 1σ at this time was 15 nm. Standardization is performed with this point as 1.

It is apparent that the distribution decreases as the angle difference on the horizontal axis increases. Moreover, it is apparent that the position shift of the pattern size can be reduced by setting the angle difference to not less than 2°.

The side surfaces 20a and 21a are not limited to vertical ones, and even if the side surfaces 20a and 21a had an inclination with respect to the base layer 30, an effect of reducing the position shift distribution amount was obtained if there was an inclination between the side surfaces 20b and 21b and the main surface of the base layer 30. The angle between the side surfaces 20a and 21a and the main surface of the base layer 30 at this time was not less than 85° and not more than 90°.

Moreover, in FIG. 9, it is when the side walls on both sides are substantially vertical that the angle difference is 0°, and in this case, since the direction in which the polymer is preferentially pushed out is not fixed, a slight inclination when the mold is pressed against the substrate becomes a big factor of the variation in position shift. That inclination slightly differs each time every press process.

Consequently, if the mold comes into contact with the substrate obliquely, the direction in which the polymer is pushed away is affected by the inclination, and the polymer tends to flow in the direction as a whole. As a result, the position shift becomes large.

On the other hand, with the mold according to the embodiment, the direction in which the end portions of the protrusions to which the force of the shift from the polymer to the mold is most strongly applied preferentially pushes away the polymer is fixed. For this reason, it is considered that the influence of the variation in inclination at the time of the start of pressing of the mold against the substrate in the press process is not readily received.

Example 2

Using the mold 100, it was examined how much of a position shift was caused when the mold 100 was pushed into the polymer applied onto the substrate if the value of the angle between the top surfaces 120c and 121c of the protrusions 120 and 121 and the main surface of the base layer 130 is increased from 0°.

Figure 10:
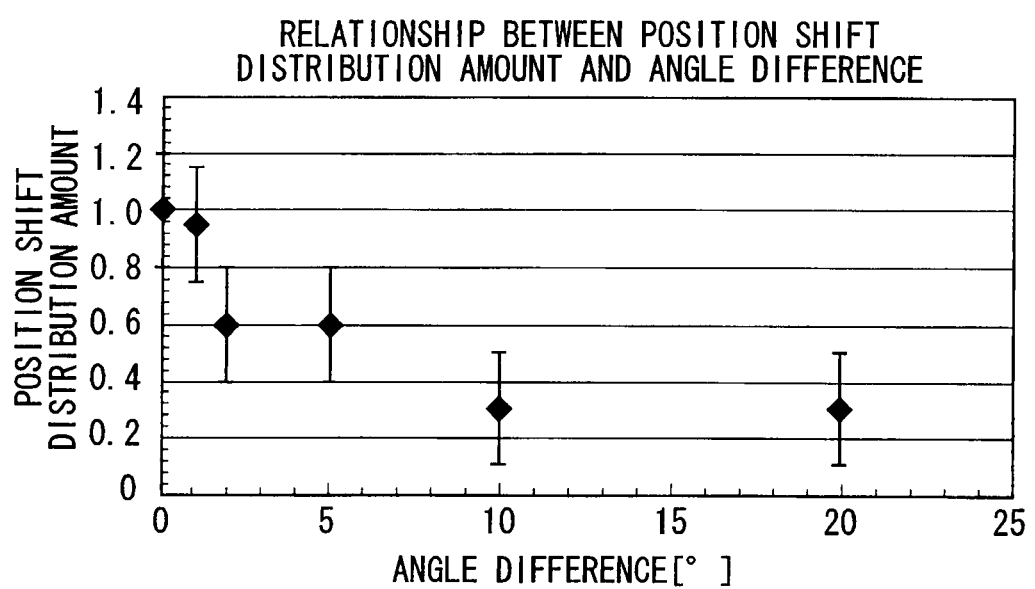
FIG. 10 is an exemplary view showing a measurement result of position shift amount of the mold according to the second embodiment.

FIG. 10 is a view where the mold 100 was pressed for ten seconds with a pressure of 1 MPa against a polymer containing a photo-curable resin applied onto a glass substrate, UV irradiation was performed thereon, the alignment position shift was read by an SEM and the result is graphed. The vertical axis of FIG. 10 represents the position shift distribution amount, and the horizontal axis represents the angle difference from 0° when the value of the angle θ between the top surfaces 120c and 121c of the protrusions 120 and 121 and the main surface of the base layer 130 was increased from 0°.

As in Example 1, when the angle difference was 0°, as the position shift distribution amount, 1σ was approximately 15 nm. Therefore, standardization was performed with this point as 1. Description of the standardization which is similar to that of Example 1 is omitted.

It is apparent that although the position shift distribution amount does not change until the angle difference becomes approximately 1°, it abruptly decreases after the angle difference becomes 3° or larger.

This also becomes zero as a whole because as in Example 1, the direction in which the polymer containing a photo-curable resin applied onto a glass substrate is easily pushed away by the top surfaces is fixed because of an inclination being present between the top surfaces 120c and 121c of the protrusions 120 and 121 and the main surface of the base layer 130 and the force from the polymer is offset by the laterally reversed protrusions disposed so as to adjoin each other.

For this reason, it is considered that this is because the influence of the variation in the angle of the initial contact between the mold and the substrate in the press process is not readily received.

While certain embodiments have been described, these embodiments have been presented by way of example only, and are not intended to limit the scope of the invention. Indeed, the novel device described herein may be embodied in a variety of other forms; furthermore, various omissions, substitutions and changes in the form of the device, described herein may be made without departing from the sprit of the invention. The accompanying claims and their equivalents are intended to cover such forms or modifications as would fall within the scope and sprit of the invention

What is claimed is:

1. A nano-imprint mold comprising:
a plurality of pairs of first and second protrusions formed on a base layer, each pair of which is formed along a same straight line, wherein
each of the first and second protrusions comprises a top surface and four side surfaces,
the first and second protrusions are mirror-symmetrical with each other,
a first side surface of the first protrusion and a second side surface of the second protrusion face each other,
a first angle between the first side surface or the second side surface and a main surface of the base layer is not less than 85° and not more than 90°,
a second angle between a third side surface opposed to the first side surface in the first protrusion or a fourth side surface opposed to the second side surface in the second protrusion and the main surface of the base layer is not less than 70° and not more than 88°, and
the first angle is larger than the second angle.

2. The mold of claim 1, wherein a third angle between the top surface of the first protrusion or the second protrusion and the main surface of the base layer is not less than 3° and not more than 20°.

3. The mold of claim 1, wherein an aluminum oxide is formed on an upper part of each of the third and fourth side surface.

4. The mold of claim 1, wherein the top surfaces of the first and second protrusions are curved or uneven.

5. The mold of claim 1, wherein a difference between the first angle between the first side surface or the second side surface and the main surface of the base layer and the second angle between the third side surface or the fourth side surface and the main surface of the base layer is not less than 3°.

6. A nano-imprint mold comprising:
a plurality of pairs of first and second protrusions formed on a base layer, each pair of which is formed along a same straight line, wherein
each of the first and second protrusions comprises a top surface and four side surfaces,
the first and second protrusions are mirror-symmetrical with each other,
a first side surface of the first protrusion and a second side surface of the second protrusion face each other,
a first angle between the first side surface or the second side surface and a main surface of the base layer is not less than 85° and not more than 90°,
a second angle between a third side surface opposed to the first side surface in the first protrusion or a fourth side surface opposed to the second side surface in the second protrusion and the main surface of the base layer is not less than 85° and not more than 90°,
a third angle between the top surface of the first protrusion or the second protrusion and the main surface of the base layer is not less than 2° and not more than 20°, and
the first angle is larger than the second angle.

* * * * *